(12) United States Patent
Kubo (10) Patent No.: US 7,576,463 B2
(45) Date of Patent: Aug. 18, 2009

(54) MAGNETIC BEARING DEVICE AND MAGNETIC BEARING SPINDLE DEVICE

(75) Inventor: Atsushi Kubo, Matsubara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 0 days.

(21) Appl. No.: 12/078,727

(22) Filed: Apr. 3, 2008

(65) Prior Publication Data

US 2008/0252161 A1   Oct. 16, 2008

(30) Foreign Application Priority Data

Apr. 4, 2007   (JP) ............................. 2007-098649

(51) Int. Cl.
*H02K 7/09* (2006.01)
*F16C 39/06* (2006.01)
(52) U.S. Cl. ..................................... 310/90.5; 361/144
(58) Field of Classification Search ................ 310/90.5; 361/143, 144, 139
See application file for complete search history.

(56) References Cited

U.S. PATENT DOCUMENTS 5,562,528 A * 10/1996 Ueyama et al. ............... 451/11
5,696,412 A * 12/1997 Iannello ..................... 310/90.5

FOREIGN PATENT DOCUMENTS

| EP | 0674112 A1 * | 9/1995 |
| JP | 10-29101 | 2/1998 |
| JP | 11-22730 | 1/1999 |
| JP | 3135410 | 12/2000 |

* cited by examiner

*Primary Examiner*—Quyen Leung
*Assistant Examiner*—Leda Pham
(74) *Attorney, Agent, or Firm*—McGinn IP Law Group, PLLC (57) ABSTRACT

A control device includes a differential amplifying circuit for obtaining a difference between values of exciting currents (exciting voltage values) supplied to a pair of axial electromagnets and a pair of radial electromagnets, multiplying the obtained difference by coefficient times, and outputting it as the bearing load in an axial direction and a radial direction. The exciting current includes steady current supplied to the axial electromagnets and the radial electromagnets and control current which varies by the displacement of a main shaft. By supplying the steady current to the axial electromagnets and the radial electromagnets, the magnetic attraction force of the axial electromagnets and the radial electromagnets having non-linearity is linearly approximated. Accordingly, the difference between the values of the exciting currents (exciting voltages) supplied to a pair of electromagnets is obtained and is multiplied by coefficient times, thereby obtaining a value corresponding to the bearing load.

3 Claims, 6 Drawing Sheets

PRIOR ART

FIG. 8

PRIOR ART

MAGNETIC BEARING DEVICE AND MAGNETIC BEARING SPINDLE DEVICE

BACKGROUND OF THE INVENTION

The present invention relates to a magnetic bearing device for supporting a main shaft of a working machine in a non-contact manner and a magnetic bearing spindle device.

Conventionally, in a working machine such as a grinding device, a cutting device, a machining center, for high-speed rotation of a main shaft, a magnetic bearing spindle device for supporting a main shaft (spindle) by a magnetic bearing in a non-contact manner has been widely used. In such a magnetic bearing spindle device, for example, as shown in JP-A-H10-29101, the spindle is generally supported by one set of axial magnetic bearings and two sets of radial magnetic bearings in the non-contact manner.

Figure 7:
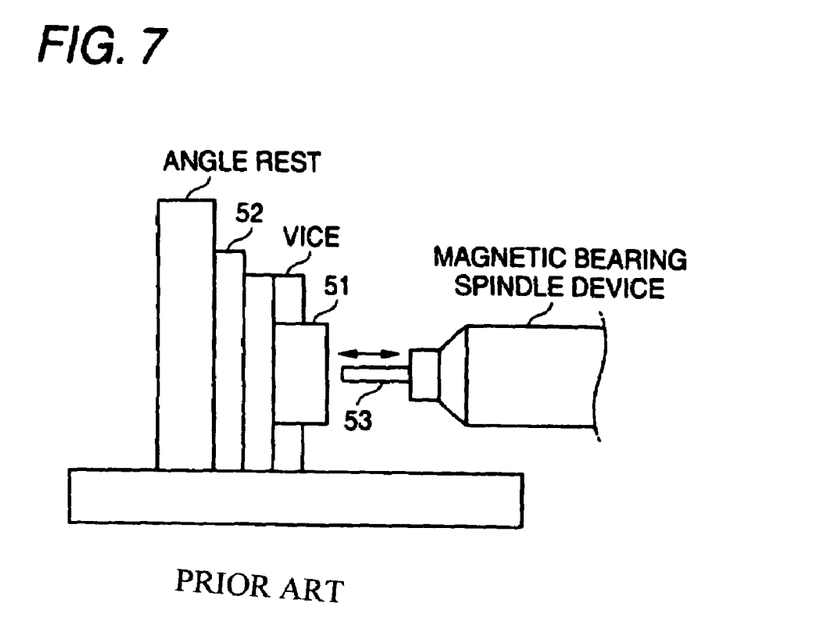
FIG. 7 is a front view showing the main portions of a working machine showing the configuration for obtaining a conventional bearing load.

In the above-described magnetic bearing spindle device, it is necessary to detect a bearing load of the magnetic bearing in order to perform abnormal diagnosis. A method of detecting the bearing load includes, for example, a method of using a piezoelectric force sensor. That is, as shown in FIG. 7, a work 51 is supported by a shoe (supportable jig) 52 including the piezoelectric force sensor therein. The force sensor converts force, which acts on the shoe 52 through the work 51 when the work 51 is machined by a machining tool 53, into an electric signal and outputs the converted electric signal as a detection signal of the force received by the work 51. A control device such as a microcomputer obtains the force received by the work 51 as the bearing load on the basis of the detection signal from the force sensor. This method is frequently employed even in a rolling spindle device using a rolling bearing such as a ball bearing as supporting means of the main shaft. However, since the above-described piezoelectric force sensor is generally expensive, it is necessary to obtain the bearing load of the magnetic bearing without using the force sensor, in view of the cost of a product.

Figure 8:
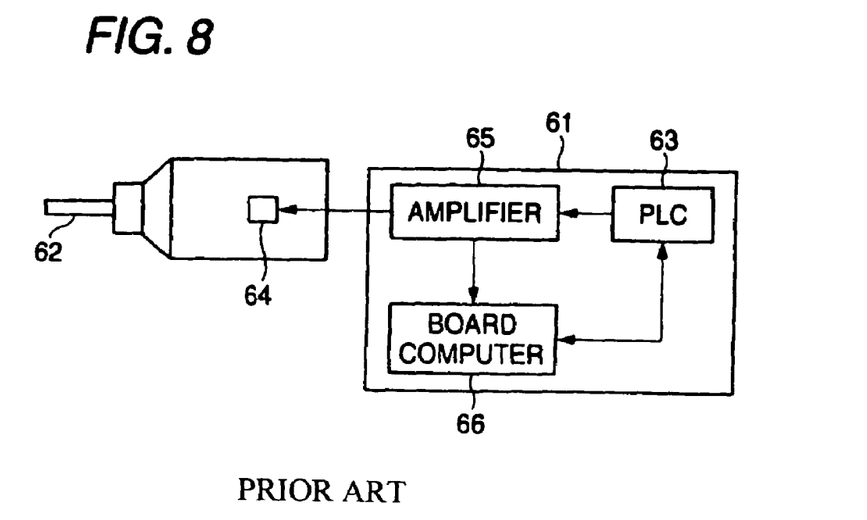
FIG. 8 is a block diagram the electric configuration for obtaining the conventional bearing load.

Accordingly, as the method of detecting the bearing load without using the force sensor, the load which acts on the magnetic bearing on the basis of current supplied to an electromagnet configuring the magnetic bearing may be obtained. However, in this case, since a relationship between the current supplied to the magnet and attraction force of the magnet is non-linear, a complicated calculation is necessary for obtaining the bearing load of the magnetic bearing on the basis of the current supplied to the magnet. Accordingly, as shown in FIG. 8, the control device 61 of the magnetic bearing includes a board computer 66 for calculating the bearing load of the magnetic bearing on the basis of the current supplied to the magnet 64 through an amplifier 65, in addition to a programmable logic controller (PLC) 63 for controlling a rising position of a main shaft 62 through the control of the supply of power to the magnet 64. The employment of the board computer is not preferred from the viewpoint of the cost of the product. However, since it is difficult to perform the complicated calculation for obtaining the bearing load in the PLC 63, the board computer 66 should be employed. Accordingly, as the configuration of the control device 61 becomes complicated, it is impossible to reduce the cost of the product.

SUMMARY OF THE INVENTION

The present invention is contrived to solve the above-described problems. An object of the invention is to provide a magnetic bearing device, which is capable of suitably obtaining a bearing load while suppressing the cost of a product, and a magnetic bearing spindle device.

According to the present invention, there is provided a magnetic baring device comprising:

a rotor;

a rotating member provided in the rotor;

a radial magnetic bearing including a pair of radial electromagnets opposed to each other with the rotor interposed therebetween to support the rotor by a magnetic attraction force at a neutral position in a radial direction in a non-contact manner;

an axial magnetic bearing including a pair of axial electromagnets opposed to each other with the rotating member interposed therebetween to support the rotor by a magnetic attraction force at the neutral position in an axial direction in a non-contact manner;

a displacement detector which detects displacement of the rotor in the radial-direction and the axial direction with respect to the neutral position and outputs the detected result as displacement information of the rotor; and a controller which supplies exciting currents, each including steady current and control current which varies in response to the displacement of the rotor, to the radial electromagnets and the axial electromagnets, respectively, to hold the rotor at the neutral position in the radial direction and the axial direction on the basis of the displacement information of the rotor obtained by the displacement detector, wherein the controller includes a calculator for obtaining first difference between values of the exciting currents supplied to the pair of radial electromagnets and obtaining a value obtained by multiplying the obtained first difference by a coefficient as a bearing load in the radial direction, and for obtaining second difference between values of the exciting currents supplied to the pair of axial electromagnets and obtaining a value obtained by multiplying the obtained second difference by a coefficient as a bearing load in the axial direction.

According to the present invention, since steady current is supplied to the pair of radial electromagnets and the pair of axial electromagnets, the attraction force of the radial electromagnets and the axial electromagnets having non-linearity are linearly approximated (to a linear function). As a result, a magnetic bearing system can be treated as a linear system and control using a linear control theory is possible. The bearing load is obtained using the linear control of the radial electromagnets and the axial electromagnets due to the steady current. That is, the difference between the values of the exciting currents supplied to the pair of radial electromagnets opposed to each other and the pair of axial electromagnets opposed to each other is obtained and is multiplied by coefficients so as to obtain the bearing load. Accordingly, the calculation load of the controller is reduced when the bearing load is obtained. Accordingly, an expensive board computer for performing complicated calculation does not need to be employed. The bearing control is possible using only a programmable logic controller (PLC) cheaper than the board computer. For example, unlike the case where the bearing load is measured by an expensive piezoelectric force sensor, the force sensor does not need to be provided. Accordingly, it is possible to suitably obtain the bearing load by simple calculation while suppressing the product cost.

According to the invention, the calculator may include differential amplifying circuits provided for the pair of radial electromagnets and the pair of axial electromagnets, respectively, and the exciting currents supplied to the pair of radial electromagnets or the pair of axial electromagnets corresponding thereto are input to an inverted input terminal and a non-inverted input terminal of the differential amplifying circuit.

According to the present invention, the exciting currents supplied to the pair of radial electromagnets or the pair of axial electromagnets are input to the inverted input terminal and the non-inverted input terminal of the differential amplifying circuits. The difference between the two current values input to the inverted input terminal and the non-inverted input terminal is amplified by a predetermined amplifying ratio and is output from the output terminal as the bearing load. Accordingly, it is possible to simply obtain the bearing load by a simple configuration such as the differential amplifying circuit.

According to the invention, in a magnetic bearing spindle device, a main shaft as a rotation shaft in which a tool or a work is mounted may be supported by the magnetic bearing device having the above arrangement in a non-contact manner.

According to the present invention, since the magnetic bearing device which can suitably obtain the bearing load by simple calculation while suppressing product cost, it is possible to reduce product cost of the magnetic bearing spindle device.

According to the present invention, it is possible to suitably obtain a bearing load while suppressing the cost of a product.

DETAILED DESCRIPTION OF PREFERRED EMBODIMENTS

Hereinafter, a magnetic bearing spindle device mounted in a working machine according to an embodiment of the present invention will be described with reference to FIGS. 1 to 6.

Figure 1:
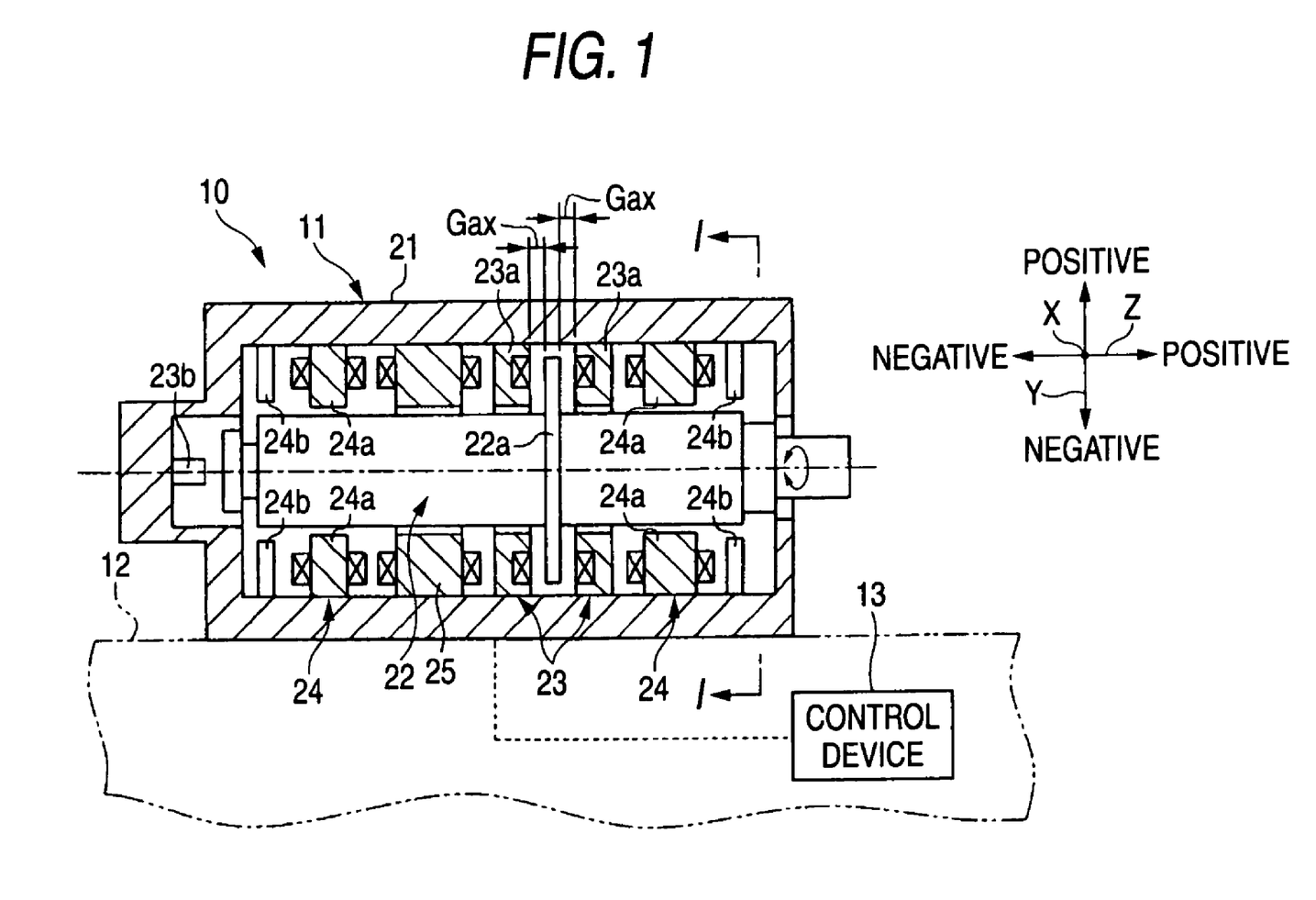
FIG. 1 is a vertical cross-sectional view showing the schematic configuration of a magnetic bearing spindle device according to the present embodiment.

As shown in FIG. 1, a magnetic bearing spindle device 11 is provided on an upper surface of a support 12 of a working machine (not shown). The magnetic bearing spindle device 11 is controlled by a control device 13. In a casing 21 of the magnetic bearing spindle device 11, a main shaft (spindle) 22 is horizontally provided on the upper surface of the support 12. An annular-plate-shaped flange member 22a is fixed on an outer circumferential surface of a middle portion of the main shaft 22. A machining tool or a work (not shown) is attached to an outer end (a right end of FIG. 1) of the main shaft 22.

In the casing 21, one set of axial magnetic bearings 23 for supporting the main shaft 22 in an axial direction in a non-contact manner and two sets of left and right radial magnetic bearings 24 and 24 for supporting the main shaft 22 in a radial direction are provided. The axial magnetic bearings 23 are provided between the two sets of radial magnetic bearings 24 and 24. The axial direction corresponds to a Z-axis direction and the radial direction corresponds to an X-axis direction and a Y-axis direction, in an XYZ coordinate system.

The axial magnetic bearings 23 includes two annular axial electromagnets 23a and 23a fixed to an inner circumferential surface of the casing 21 and an axial displacement sensor 23b fixed to an inner bottom surface of the casing 21 so as to be opposed to an inner end (a left end of FIG. 1) of the main shaft 22.

The two axial electromagnets 23a and 23a are opposed to each other with the flange member 22a interposed therebetween in the axial direction. A predetermined gap (axial gap) Gax is formed between the side surfaces of the flange members 22a of the axial magnets 23a and 23a and the two annular surfaces located at the opposite side of the flange member 22a in the axial direction of the main shaft 22. The displacement in the axial direction (Z-axis direction) is detected by the axial displacement sensor 23b and the attraction forces of the two axial magnets 23a and 23a are adjusted on the detected result such that the main shaft 22 rises in the axial direction and is stably supported at a predetermined neutral position in the axial direction in a non-contact manner.

Figure 2:
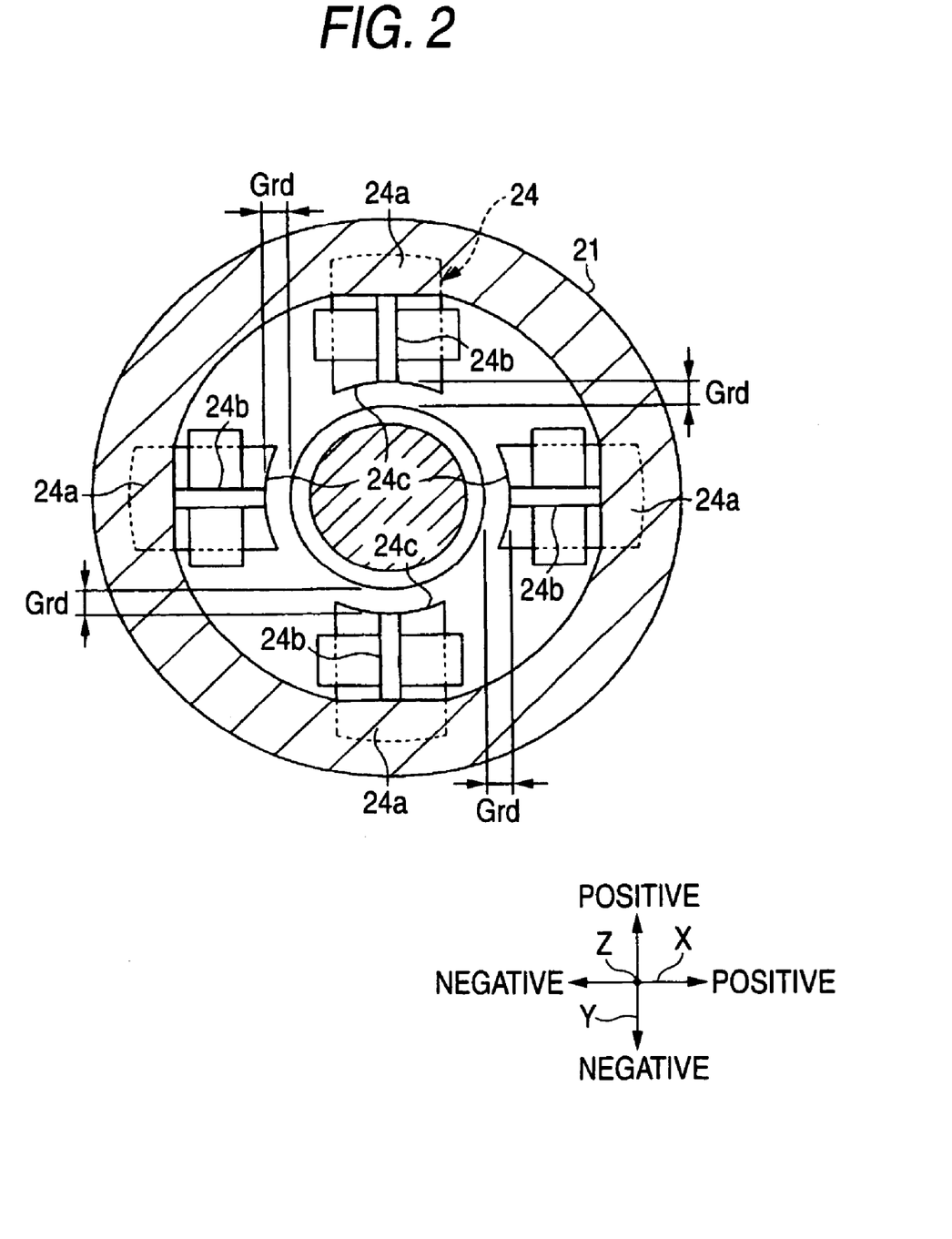
FIG. 2 is a cross-sectional view taken along line 1-1 of FIG. 1.

As shown in FIG. 2, one set of radial magnet bearings 24 includes four radial electromagnets 24a fixed to the inner circumferential surface of the casing 21 and four radial displacement sensors 24b provided in correspondence with the radial magnets 24a. Two pairs of radial magnets 24a are provided so as to be opposed to each other with the main shaft 22 interposed therebetween in two radial directions (the X-axis direction and the Y-axis direction of the XYZ coordinate system) perpendicular to each other. That is, the four radial magnets 24a are arranged by 90 degrees in a rotation direction of the main shaft 22. In the front end surfaces of the four radial magnets 24a, arc surfaces 24c corresponding to the curvature of the outer circumferential of the main shaft 22 are formed. Predetermined gaps (radial gaps) Grd are formed between the arc surfaces 24c and the outer circumferential surface of the main shaft 22. The displacement in the two radial directions of the main shaft 22 perpendicular to each other is detected by the four radial displacement sensors 24b and the attraction forces of the four radial magnets 24a are adjusted on the basis of the detected result such that the main shaft 22 rises in the radial direction and is stably supported at a predetermined neutral position in the radial direction in a non-contact manner.

As shown in FIG. 1, in the casing 21, a motor 25 is mounted as a driving source for rotating the main shaft 22 between the axial electromagnets 23a arranged inside the casing 21 and the radial electromagnets 24a arranged inside the casing. The motor 25 is fixed to the inner circumference surface of the casing and includes a stator, on which a coil is wound, and a magnet rotor (not shown) provided on a portion corresponding to the stator on the outer circumferential surface of the main shaft 22.

<Electric Configuration>

Next, the electric configuration of the magnetic bearing spindle device 11 will be described.

Figure 3:
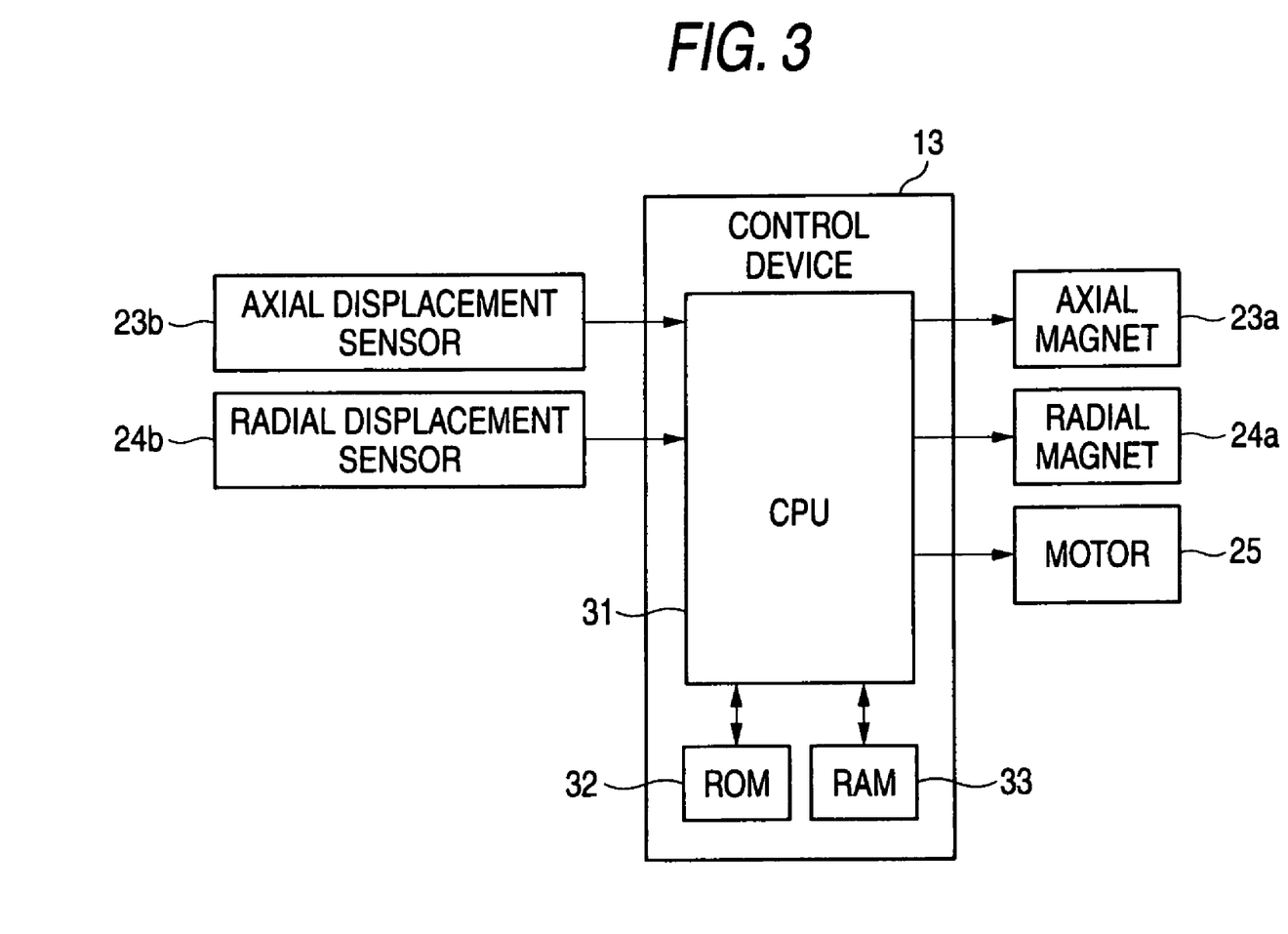
FIG. 3 is a block diagram showing the electric configuration of the magnetic bearing spindle device.

As shown in FIG. 3, the control device 13 of the magnetic bearing spindle device 11 includes a central processing unit (CPU) 31, a read only memory (ROM) 32, and a random access memory (RAM) 33. The CPU 31, the ROM 32 and the RAM 33 are connected to one another through a bus (not shown). In the ROM 32, various types of control programs for controlling the portions of the magnetic bearing spindle device 11 are stored. The control programs may include an electromagnet control program for controlling the supply of power of the axial electromagnets 23a and the radial electromagnets 24a and a motor control program for controlling the driving of the motor 25. The RAM 33 is a data storage area, that is, a working area for developing the control programs stored in the ROM 32 and executing various types of processes by the CPU 31. The CPU 31 controls the magnetic bearing spindle device 11 on the basis of various types of control programs stored in the ROM 32.

The CPU 31 is connected to the two axial electromagnets 23a configuring one set of axial electromagnetic bearings 23 and total eight radial electromagnets 24a configuring two sets of radial magnetic bearings 24. The CPU 31 is connected to the axial displacement sensor 23b configuring one set of axial magnetic bearings 23 and total eight radial displacement sensors 24b configuring two sets of radial magnetic bearings 24. The CPU 31 is connected to the motor 25 through a motor driving circuit (not shown). In FIG. 3, for convenience sake, one axial electromagnet 23a, one axial displacement sensor 23b, one radial electromagnet 24a and one radial displacement sensor 24b are shown.

The axial displacement sensor 23b detects the displacement in the axial direction of the main shaft 22 and outputs the detection signal to the CPU 31 as displacement information in the axial direction of the main shaft 22. The radial displacement sensors 24b detect the displacement in the radial direction of the main shaft 22 and output the detection signal to the CPU 31 as displacement information in the radial direction of the main shaft 22. The axial displacement sensor 23b and the radial displacement sensors 24b configure a displacement detector according to the present invention.

The CPU 31 controls the supply of power to the axial electromagnets 23a and the radial electromagnets 24a on the basis of the displacement information of the main shaft 22 acquired through the axial displacement sensor 23b and the radial displacement sensors 24b and adjusts the attraction forces of the axial electromagnets 23a and the radial electromagnets 24a.

In more detail, the CPU 31 supplies exciting current including steady current and control current, of which the value is changed on the basis of the displacement of the main shaft 22, to the axial electromagnets 23a and the radial electromagnets 24a, that is, an exciting coil configuring them. The steady currents supplied to a pair of axial electromagnets 23a opposed to each other in the axial direction and a pair of radial electromagnets 24a opposed to each other in the two radial directions perpendicular to each other are equal to each other and become a constant value regardless of the displacement of the main shaft 22.

The CPU 31 changes the control current supplied to the axial electromagnets 23a and the radial electromagnets 24a on the basis of the displacement information of the main shaft 22 acquired through the axial displacement sensor 23b and the radial displacement sensors 24b. The control currents supplied to a pair of axial electromagnets 23a opposed to each other and a pair of radial electromagnets 24a opposed to each other have the same absolute values and opposite signs thereof (+ and −). That is, when the control current supplied to one axial electromagnet 23a and radial electromagnet 24a is a positive value, the control current supplied to the other axial electromagnet 23a and radial electromagnet 24a becomes a negative value of which the absolute value is equal to that of the control current supplied to one axial electromagnet 23a and radial electromagnet 24a.

In addition, steady current is supplied to the axial electromagnets 23a and the radial electromagnets 24a as bias current such that the relationship between the control current supplied to the axial electromagnets 23a and the radial electromagnets 24a and the magnetic attraction force becomes linear.

<Relationship Between Control Current and Magnetic Attraction Force>

Now, the relationship between the control current supplied to the pair of axial electromagnets 23a and a pair of radial electromagnets 24a opposed to each other in the X-axis direction will be described. In the relationship between the supplied control current and the magnetic attraction force, the pair of axial electromagnets 23a and a pair of radial electromagnets 24a opposed to each other in the X-axis direction have the same relationship. Accordingly, the relationship between the control current supplied to a pair of radial electromagnets 24a and 24a opposed to each other in the X-axis direction (horizontal direction of FIG. 2) and the magnetic attraction force will be representatively described.

<X-Axis Direction and Z-Axis Direction>

Figure 4:
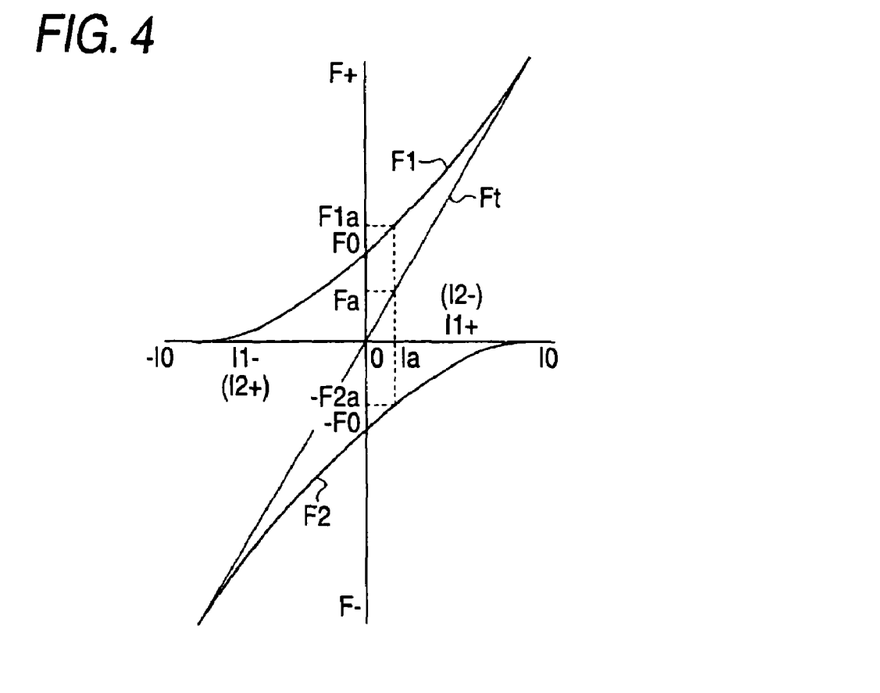
FIG. 4 is a graph showing a relationship between the control current supplied to a pair of radial magnets opposed to each other in an X-axis direction and the attraction force of the magnet.

In the graph shown in FIG. 4, a horizontal axis shows the control current I1 supplied to the radial electromagnet 24a of the X-axis positive side (right side of FIG. 2) and the control current I2 supplied to the radial electromagnet 24a of the X-axis negative side (left side of FIG. 2). The control current I1 has a positive value at the right side and has a negative value at the left side on the basis of an original point 0 of the graph. Since the control current I2 has the same absolute value as the control current I1 and opposite signs (positive and negative values), the control current I2 has a positive value at the left side and has a negative value at the right side on the basis of the original point 0 of the graph. In the graph, a vertical axis shows a magnetic attraction force F. The magnetic attraction force F has a positive value at an upper side and has a negative value at a lower side on the basis of the original point 0.

When the X-axis positive side of the magnetic attraction force F is positive and the X-axis negative side thereof is negative, the magnetic attraction force F1 is positive and the magnetic attraction force F2 is negative. In the radial electromagnet 24a of the X-axis positive side, the magnetic attraction force F1 becomes zero when the control current I1 has the negative value of which the absolute value is equal to that of the steady current I0. As the control current I1 is increased, the magnetic attraction force F1 is increased quadratic functionally.

In the radial electromagnet 24a of the X-axis negative side, the magnetic attraction force F2 becomes zero when the control current I2 has the negative value of which the absolute value is equal to that of the steady current I0, that is, when the control current I1 has the positive value of which the absolute value is equal to that of the steady current I0. As the control current I2 is increased, that is, as the control current I1 is decreased, the absolute value of the magnetic attraction force F2 is increased quadratic functionally.

When the control currents I1 and I2 are zero, the exciting current becomes equal to the steady current I0. The magnetic attraction force F1 of the radial electromagnet 24a of the X-axis positive side becomes F0, the magnetic attraction force F2 of the radial electromagnet 24a of the X-axis negative side becomes −F0, and the total magnetic attraction force Ft of a pair of radial electromagnets 24a opposed to each other becomes zero. The total magnetic attraction force Ft becomes a straight line which passes through the original point 0 and is increased according to the control current I1 of the radial electromagnet 24a of the X-axis positive side is increased. That is, the control current I1 is proportional to the total magnetic attraction force Ft.

The CPU 31 obtains the total magnetic attraction force Ft of a pair of radial electromagnets 24a corresponding to the displacement in the X-axis direction of the main shaft 22 and obtains the control current I1 of the radial electromagnet 24a of the X-axis positive side corresponding to the obtained magnetic attraction force Ft, through the known PID control (not shown). The CPU 31 outputs control current Vo1 corresponding to the control current I1 to the radial electromagnet 24a of the X-axis positive side and outputs a control current signal Vo2 corresponding to the control current −I1 having the negative value of which the absolute value is equal to that of the control current I1 to the radial electromagnet 24a of the X-axis negative side. As described above, since the control current I1 of the radial electromagnet 24a of the X-axis positive side is proportional to the total magnetic attraction force FT of a pair of radial electromagnets 24a of the X-axis positive side and the X-axis negative side, if the total magnetic attraction force Ft is obtained, it is possible to obtain the control current I1 of the radial electromagnet 24a of the X-axis positive side from the proportional relationship shown in the graph of FIG. 4.

For example, if the main shaft 22 is slightly displaced from a neutral position to the X-axis negative side in the X-axis direction, this slight displacement is detected by the radial displacement sensor 24b and exciting current is supplied to a pair of radial electromagnets 24a of the X-axis positive side and the X-axis negative side such that the main shaft 22 is returned to the neutral position, on the basis of the detected result.

That is, as shown in the graph of FIG. 4, exciting current (=I0+Ia) obtained by adding the steady current I0 and control current Ia having a positive value is supplied to the radial electromagnet 24a of the X-axis positive side. As a result, magnetic attraction force F1a which is directed to the X-axis positive side corresponding to the exciting current is generated in the radial electromagnet 24a of the X-axis positive side. Exciting current (=I0−Ia) obtained by adding the steady current I0 and the control current −Ia having a negative value is supplied to the radial electromagnet 24a of the X-axis negative side. As a result, magnetic attraction force −F2a which is directed to the X-axis negative side corresponding to the exciting current is generated in the radial electromagnet 24a of the X-axis negative side.

Here, since the absolute value of the magnetic attraction force F1a of the radial electromagnet 24a of the X-axis positive side is larger than that of the magnetic attraction force −F2a of the radial electromagnet 24a of the X-axis negative side, the total magnetic attraction force Ft=Fa of a pair of radial electromagnets 24a of the X-axis positive side and the X-axis negative side has a positive value. Accordingly, the main shaft 22 is attracted to the X-axis positive side, that is, a side in which the displacement is decreased.

If the main shaft 22 is slightly displaced from the neutral position to the X-axis positive side in the X-axis direction, the total magnetic attraction force Ft of a pair of radial electromagnets 24a of the X-axis positive side and the X-axis negative side becomes a negative value in opposition to the above-described case. Control current having a negative value proportional to the total magnetic attraction force Ft is supplied to the radial electromagnet 24a of the X-axis positive side and control current having a positive value of which the absolute value is equal to that of the control current supplied to the radial electromagnet 24a of the X-axis positive side is supplied to the radial electromagnet 24a of the X-axis negative side.

The control currents of a pair of radial electromagnets 24a and 24a of the X-axis positive side and the X-axis negative side are controlled such that the main shaft 22 is held at the neutral position in the X-axis direction. A relationship between the control current supplied to a pair of axial electromagnets 23a and 23a and the magnetic attraction force is as follows.

<Y-Axis Direction>

Next, the relationship between the control current supplied to a pair of radial electromagnets 24a and 24a opposed to each other in the Y-axis direction (vertical direction of FIG. 1) and the magnetic attraction force will be described.

Figure 5:
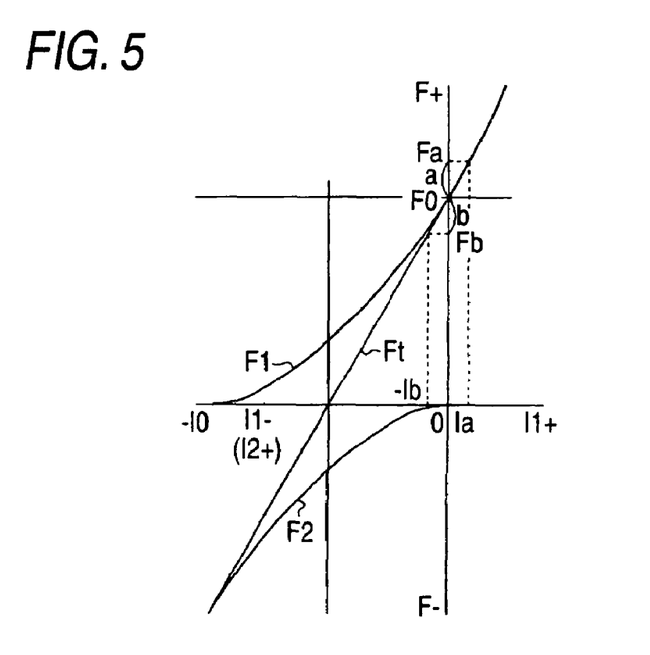
FIG. 5 is a graph showing a relationship between the control current supplied to a pair of radial magnets opposed to each other in a Y-axis direction and the attraction force of the magnet.

In the graph of FIG. 5, a horizontal axis shows the control current I1 supplied to the radial electromagnet 24a of the Y-axis positive side (upper side of FIG. 1), and the right side is positive and the left side is negative on the basis of the original point 0 of the graph. The control current I2 supplied to the radial electromagnet 24a of the Y-axis negative side (lower side of FIG. 1) has a positive value and the absolute value thereof is equal to that of the control current I1 having the negative value supplied to the radial electromagnet 24a of the Y-axis positive side. Accordingly, the control current I2 of the radial electromagnet 24a of the Y-axis negative side is also shown at the left side of the original point 0 of the horizontal axis of the graph. With respect to the control current I2, the left side is positive and the right side is negative on the basis of the original point 0 of the graph.

In the graph, a vertical axis shows the magnetic attraction force F, and the upper side is positive and the lower side is negative on the basis of the original point 0. When the control current I1 supplied to the radial electromagnet 24a of the Y-axis positive side has a negative value −I0 of which the absolute value is equal to that of the steady current I0, the magnetic attraction force F1 of the radial electromagnet 24a of the Y-axis positive side becomes zero. The magnetic attraction force F1 is increased quadratic functionally as the control current I1 is increased and becomes F0 when the control current I1 is zero. In an area in which the control current I1 of the radial electromagnet 24a of the Y-axis positive side has the positive value, the control current I2 of the radial electromagnet 24a of the Y-axis negative side becomes zero, that is, the magnetic attraction force F2 of the radial electromagnet 24a of the Y-axis negative side becomes zero. Accordingly, the magnetic attraction force F1 of the radial electromagnet 24a of the Y-axis positive side becomes the magnetic attraction force Ft of a pair of radial electromagnets 24a and 24a of the Y-axis positive side and the Y-axis negative side.

When the control current I1 of the radial electromagnet 24a of the Y-axis positive side is zero, the control current I2 of the radial electromagnet 24a of the Y-axis negative side becomes zero, that is, the magnetic attraction force F2 of the radial electromagnet 24a of the Y-axis negative side becomes zero. In an area in which the control current I1 of the radial electromagnet 24a of the Y-axis positive side has a negative value, the absolute of the magnetic attraction force F2 of the radial electromagnet 24a of the Y-axis negative side is increased quadratic functionally as the control current I1 is increased (the control current I2 is increased). Accordingly, the total magnetic attraction force Ft of a pair of radial electromagnets 24a and 24a of the Y-axis positive side and the Y-axis negative side becomes a straight line which passes through a point in which the control current I1 is zero and the magnetic attraction force F1 is F0 and is decreased as the control current I1 is decreased. That is, the control current I1 is proportional to the total magnetic attraction force Ft.

Next, when the displacement of the main shaft 22 in the Y-axis direction is zero, the value of the magnetic attraction force F1 obtained by the CPU 31 becomes zero, that is, the control currents I1 and I2 corresponding thereto become zero. Accordingly, the exciting current supplied from the CPU 31 to the radial electromagnet 24a of the Y-axis positive side becomes equal to the steady current I0, the exciting current supplied to the radial electromagnet 24a of the Y-axis negative side becomes zero, and the total magnetic attraction force Ft of a pair of radial electromagnets 24a and 24a of the Y-axis positive side and the Y-axis negative side becomes F0. The magnetic attraction force F0 is balanced with the gravity acting on the main shaft 22 such that the main shaft 22 is held at the neutral position in the Y-axis direction.

When the main shaft 22 is displaced to the Y-axis negative side, the value of the magnetic attraction force Ft calculated by the CPU 31 becomes a positive value. That is, the total magnetic attraction force Ft becomes a value Fa obtained by adding an increment a to the above-described magnetic attraction force F0. The CPU 31 obtains the control current I1 of the radial electromagnet 24a of the Y-axis positive side corresponding to the magnetic attraction force Fa from the stored relationship between the total magnetic attraction force Ft and the control current I1 and supplies it to the radial electromagnet 24a of the Y-axis positive side. Accordingly, the exciting current of the radial electromagnet 24a of the Y-axis positive side becomes (I0+Ia). That is, since the upward magnetic attraction force Fa(=F0+a) due to the radial electromagnet 24a of the Y-axis positive side becomes larger than gravity (=Fo) acting on the main shaft 22, the main shaft 22 receives an upward force.

When the main shaft 22 is displaced to the Y-axis positive side, the value of the magnetic attraction force calculated by the CPU 31 becomes a negative value. That is, the total magnetic attraction force Ft becomes a value Fb obtained by subtracting a decrement b from the above-described magnetic attraction force F0. The CPU 31 obtains the negative control current −Ib corresponding to the magnetic attraction force Fb from the stored relationship between the total magnetic attraction force Ft and the control current I1 and supplies it to the radial electromagnet 24a of the Y-axis negative side. In addition, the CPU 31 supplies the control current Ib having the positive value of which the absolute value is equal to that of the control current Ib to the radial electromagnet 24a of the Y-axis negative side. Accordingly, the exciting current of the radial electromagnet 24a of the Y-axis positive side becomes (I0−Ib) and the exciting current of the radial electromagnet 24a of the Y-axis negative side becomes Ib. That is, the upward magnetic attraction force Fb(=F0−b) due to a pair of radial electromagnets 24a and 24a of the Y-axis positive side and the Y-axis negative side becomes smaller than gravity acting on the main shaft 22, and the main shaft 22 receives a downward force.

The control current of a pair of radial electromagnets 24a and 24a of the Y-axis positive side and the Y-axis negative side is controlled such that the main shaft 22 is held at the neutral position in the Y-axis direction.

<Detection Circuit of Bearing Load>

The load capacity of a magnetic bearing which is a non-contact bearing is generally smaller than that of a bearing. Accordingly, if a large load is applied to the main shaft 22 due to any cause, the main shaft 22 may be brought into contact with the magnetic bearing. Accordingly, in a working machine in which the magnetic bearing is mounted, in order to suitable control the magnetic bearing and the main shaft supported by the bearing according to the bearing load, it is necessary to monitor the bearing load. Accordingly, the control device 13 of the magnetic bearing spindle device 11 having the above-described configuration, a calculator for obtaining the bearing load is provided. The calculator is configured to obtain the bearing load using linear control of the axial electromagnet 23a and the radial electromagnet 24a by the steady current (bias current).

Figure 6:
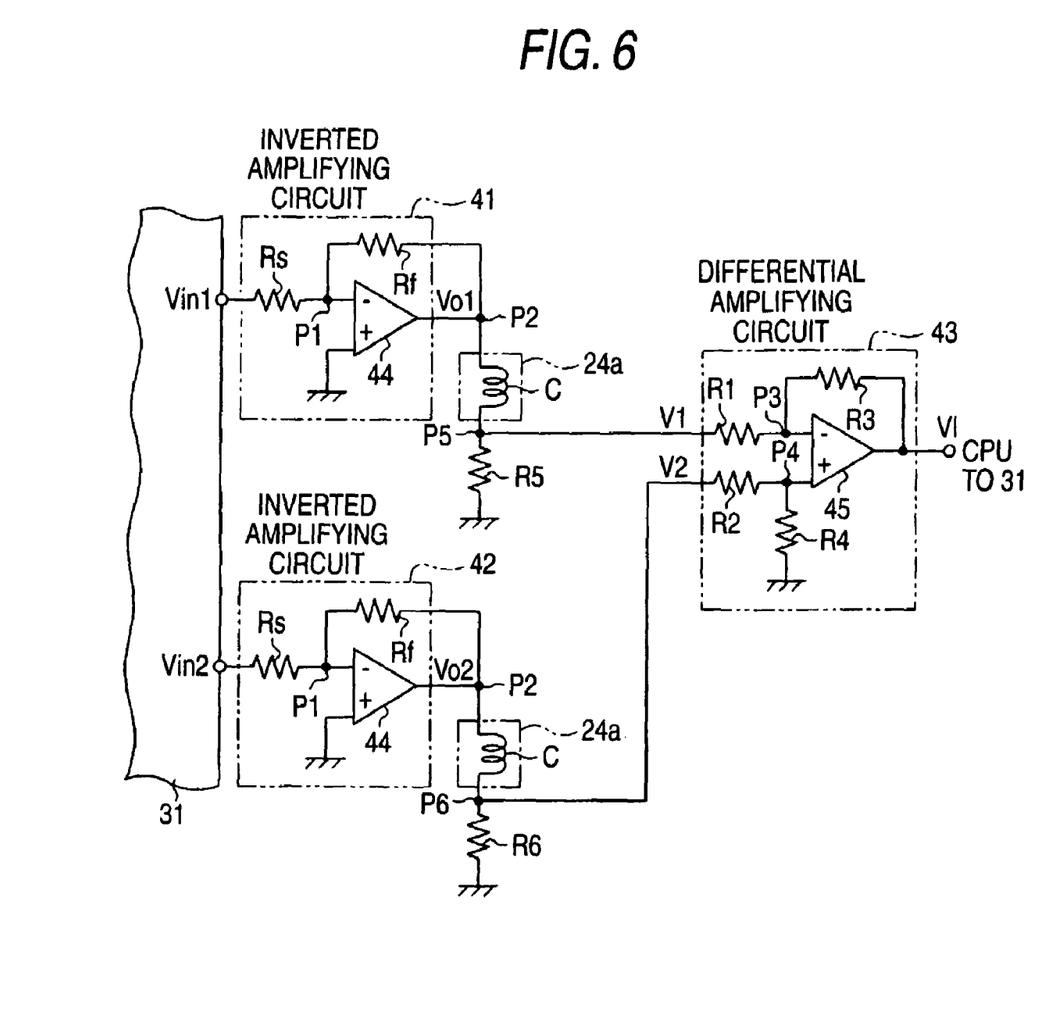
FIG. 6 is a circuit block diagram showing the connection state of a differential amplifying circuit for detecting a bearing load.

That is, as shown in FIG. 6, inverted amplifying circuits are provided between the CPU 31 and the axial electromagnets 23a and the radial electromagnets 24a. In the same drawing, for convenience of description, only a pair of inverted amplifying circuits 41 and 42 corresponding to a pair of radial electromagnets 24a and 24a is shown. The output terminals of the inverted amplifying circuits 41 and 42 are connected to a differential amplifying circuit 43 through exciting coils C and C of the radial electromagnets 24a and 24a corresponding thereto. The differential amplifying circuit 43 corresponds to the calculator of the present invention.

An inverted input terminal (−) of an amplifier 44 configuring the inverted amplifying circuit 41 is connected to the CPU 31 through an input resistor Rs and a non-inverted input terminal (+) is connected to ground. A feedback resistor Rf is connected between a node P1 between the input resistor Rs and the inverted input terminal (−) of the amplifier 44 and a node P2 between the output terminal of the amplifier 44 and the exciting coil C. The inverted amplifying circuit 42 has the same configuration as the inverted amplifying circuit 41. Thus, the same portions are denoted by the same reference numerals and the detailed description thereof will be omitted.

Accordingly, in order to control the attraction force of the radial electromagnet 24a, control instruction signals Vin1 and Vin2 output from the CPU 31 are amplified to control current signals Vo1 and Vo2 by an amplifying ratio (=Rf/Rs) based on the resistance value of the input resistor Rs and the resistance value of the feedback resistor Rf. The control current signals Vo1 and Vo2 are supplied to the exciting coils C and C through the output terminals of the amplifiers 44 and 44 (Vo1=−(Rf/Rs)Vin1, Vo2=−(Rf/Rs)Vin2). As a result, the control currents I1 and I2 are generated in the exciting coil C.

An inverted input terminal (−) of an amplifier 45 configuring the differential amplifying circuit 43 is connected to an end at the opposite side of the amplifier 44 of the exciting coil C configuring one radial electromagnet 24a of the pair of radial electromagnets 24a and 24a through the input resistor R1. Similarly, a non-inverted input terminal (+) of the amplifier 45 is connected to an end at the opposite side of the amplifier 44 of the exciting coil C configuring the other radial electromagnet 24a of the pair through the input resistor R2. A feedback resistor R3 is connected between a node P3 between the input resistor R1 and the inverted input terminal (−) of the amplifier 45 and the output terminal of the amplifier 45. A resistor R4 is connected between a node P4 between the input resistor R2 and the non-inverted input terminal (+) of the amplifier 45 and ground. The resistance values of the two input resistors R1 and R2 are equal to each other (R1=R2). The resistance values of the feedback resistor R3 and the resistor R4 are equal to each other (R3=R4).

Here, a resistor R5 is connected between a node P5 between the exciting coil C of the radial electromagnet 24a corresponding to the inverted amplifying circuit 41 and the input resistor R1 of the differential amplifying circuit 43 and ground. A resistor R6 is connected between a node P6 between the exciting coil C of the radial electromagnet 24a corresponding to the inverted amplifying circuit 42 and the input resistor R2 of the differential amplifying circuit 43 and ground. Accordingly, the control current supplied to the exciting coil C of the two radial electromagnets 24a and 24a forming the pair is converted into a voltage through the resistors R5 and R6 and is input to the inverted input terminal (−) and the non-inverted input terminal (+) of the amplifier 45.

Accordingly, the exciting currents generated in the exciting coils C and C of the two radial electromagnets 24a and 24a forming the pair are converted into predetermined voltages V1 and V2 on the basis of the resistance values of the resistors R5 and R6 and are input to the inverted input terminal (−) and the non-inverted input terminal (+) of the amplifier 45 configuring the differential amplifying circuit 43. The amplifier 45 amplifies a difference V1−V2 between the voltages V1 and V2 to a bearing load signal V1 by an amplifying ratio (=R3/R1) based on the feedback resistor R3 and the input resistor R1 and outputs the bearing load signal V1 to the CPU 31 through the output terminal.

As described above, a difference between the exciting currents (steady current+control current) supplied to the two radial electromagnets 24a and 24a forming the pair is obtained from the proportional relationship between the magnetic attraction forces F of the pair of radial electromagnets 24a and 24a and the control currents I1 and I2 and is multiplied by coefficients, thereby obtaining a result (current value) corresponding to the bearing load expressed by the magnetic attraction force F. In the present embodiment, a difference between the voltage values (exciting voltage values) V1 and V2 corresponding to the exciting currents supplied to the two radial electromagnets 24a and 24a forming the pair is obtained and the difference (=V1−V2) is multiplied by coefficients (here, "R3/R1" times) such that the bearing load signal V1 which becomes the value corresponding to the bearing load is output to the CPU 31 as the result of detecting the bearing load. This is true in a pair of axial electromagnets 23a and 23a and two sets of radial electromagnets 24a and 24a in which two pairs configure one set.

The CPU 31 determines the load state of one set of axial magnetic bearings 23 and two sets of radial magnetic bearings 24 on the basis of the output from the differential amplifying circuit 43 provided in correspondence with a pair of axial electromagnets 23a and 23a and plural pairs (eight pairs in the present embodiment) of radial electromagnets 24a and 24a. The CPU 31 performs the control of the magnetic attraction force of the axial electromagnets 23a and the radial electromagnets 24a and the rotation number control of the main shaft 22 according to the load state.

Effect of Embodiment

Accordingly, the following effect can be obtained according to the present embodiment.

(1) The control device 13 includes the differential amplifying circuit 43 as the calculator for obtaining the difference between the voltage values V1 and V2 corresponding to the exciting currents supplied to a pair of axial electromagnets 23a and a pair of radial electromagnets 24a and multiplying the difference (=V1−V2) by coefficients ("R3/R1" times) to obtain the bearing load in the radial direction and the axial direction. The operation for obtaining the difference between the voltage values corresponding to the exciting currents supplied to a pair of axial electromagnets 23a and a pair of radial electromagnets 24a and multiplying the difference by the coefficients is similar to the operation for obtaining the difference between the values of the exciting currents supplied to a pair of axial electromagnets 23a and a pair of radial electromagnets 24a and multiplying the difference by the coefficients.

By this configuration, since the steady current is supplied to a pair of radial electromagnets 24a and 24a and a pair of axial electromagnets 23a and 23a, the magnetic attraction force of the axial electromagnet 23a and the radial electromagnet 24a having non-linearity is linearly approximated (to a linear function). As a result, a magnetic bearing system can be treated as a linear system and control using a linear control theory is possible. The bearing load is obtained using the linear control of the radial electromagnet 24a and the axial electromagnet 23a due to the steady current. That is, the difference between the values of the exciting currents supplied to a pair of radial electromagnets 24a and 24a opposed to each other and a pair of axial electromagnets 23a and 23a opposed to each other is obtained and is multiplied by coefficients so as to obtain the bearing load (accurately, the value corresponding to the bearing load).

Accordingly, the calculation load of the control device 13 and more accurately the CPU 31 is reduced when the bearing load is obtained. Accordingly, in order to perform complicated calculation, an expensive board computer does not need to be employed. The bearing control using only a programmable logic controller (PLC) cheaper than the board computer is possible. For example, unlike the case where the bearing load is measured by an expensive piezoelectric force sensor, the force sensor does not need to be provided. Accordingly, it is possible to suitably obtain the bearing load by simple calculation while suppressing the product cost of the magnetic bearing spindle device 11. Since the board computer does not need to be mounted, the space of the magnetic bearing spindle device 11 is saved.

(2) The exciting currents supplied to a pair of radial electromagnets 24a and 24a and a pair of axial electromagnets 23a and 23a are converted into the voltage values and the voltage values are input to the inverted input terminal (−) and the non-inverted input terminal (+1) of the differential amplifying circuit 43. The difference between the two voltage values input to the inverted input terminal (−) and the non-inverted input terminal (+) is amplified by the predetermined amplifying ratio and is output from the output terminal of the differential amplifying circuit 43. The control device 13 and more accurately the CPU 31 determines abnormal determination of the voltage value output from the output terminal as the bearing load. The bearing load (accurately, the value corresponding to the bearing load) can be simply obtained by the simple configuration of the differential amplifying circuit 43.

(3) In the magnetic bearing spindle device 11, the main shaft 22 as the rotor in which a tool or a work is mounted is supported by the magnetic bearing device including a set of axial magnetic bearings 23 and two sets of radial magnetic bearings 24 in a non-contact manner.

By this configuration, since the magnetic bearing device which can suitably obtain the bearing load by the simple calculation while suppressing the product cost is employed, it is possible to reduce the product cost of the magnetic bearing spindle device 11.

Other Embodiments

The above-described embodiment may be modified as follows.

Although a single differential amplifying circuit 43 is provided with respect to a pair of axial electromagnets 23a and 23a and a pair of radial electromagnets 24a and 24a in the present embodiment, a differential amplifying device having a plurality of channels (five channels in the present example) in which a plurality of differential amplifying circuits 43 are integrally mounted may be used. Even by this configuration, it is possible to suitable obtain the bearing load due to the displacement of the both ends of the main shaft 22 in the two radial direction (X-axis direction and Y-axis direction) perpendicular to each other and the axial direction (Z-axis direction).

Although the steady current (bias current) is always supplied to a pair of axial electromagnets 23a and a pair of radial electromagnets 24a so as to perform linear approximation of the magnetic attraction force of the axial electromagnets 23a and the radial electromagnets 24a such that spatial position control of the main shaft 22 is performed in the present embodiment, the following configuration may be used. That is, instead of the supply of the steady current to the axial electromagnets 23a and the radial electromagnets 24a, a linear control method for applying a bias using a permanent magnet may be employed. By this configuration, the linear control of the magnets can be realized without supplying the steady current to the axial electromagnets 23a and the radial electromagnets 24a. In addition, power consumption due to the axial electromagnets 23a and the radial electromagnets 24a can be suppressed.

<Other Technologies>

Next, the technologies which are obtained from the embodiments and the additional examples will be described.

In a method of detecting a bearing load of a magnetic baring device including: a radial magnetic bearing including a pair of radial electromagnets opposed to each other with a rotor interposed therebetween, in order to support the rotor by a magnetic attraction force at a neutral position in a radial direction in a non-contact manner; an axial magnetic bearing including a pair of axial electromagnets opposed to each other with a rotating member provided in the rotor interposed therebetween, in order to support the rotor by the magnetic attraction force at the neutral position in an axial direction in the non-contact manner; a displacement detector which detects displacement of the rotor in the radial direction and the axial direction of the neutral position and outputs the detected result as displacement information of the rotor; and a controller which supplies exciting current including steady current and control current, which varies by the displacement of the rotor, to the radial electromagnets and the axial electromagnets, in order to hold the rotor at the neutral position in the radial direction and the axial direction on the basis of the displacement information of the rotor acquired by the displacement detector, a difference between values of exciting currents supplied to the pair of radial electromagnets opposed to each other in the radial direction and values of exciting currents supplied to the pair of axial electromagnets opposed to each other in the axial direction is obtained and the obtained difference is multiplied by coefficients so as to obtain a bearing load in the radial direction and the axial direction. According to the present invention, the same effect described above can be obtained.

What is claimed is:

1. A magnetic bearing device comprising:
   a rotor;
   a rotating member provided in the rotor;
   a radial magnetic bearing including a pair of radial electromagnets opposed to each other with the rotor interposed therebetween to support the rotor by a magnetic attraction force at a neutral position in a radial direction in a non-contact manner;
   an axial magnetic bearing including a pair of axial electromagnets opposed to each other with the rotating member interposed therebetween to support the rotor by a magnetic attraction force at the neutral position in an axial direction in a non-contact manner;
   a displacement detector which detects displacement of the rotor in the radial direction and the axial direction with respect to the neutral position and outputs the detected result as displacement information of the rotor; and
   a controller which supplies exciting currents, each including steady current and control current which varies in response to the displacement of the rotor, to the radial electromagnets and the axial electromagnets, respectively, to hold the rotor at the neutral position in the radial direction and the axial direction on the basis of the displacement information of the rotor obtained by the displacement detector,
   wherein the controller includes a calculator for obtaining first difference between values of the exciting currents supplied to the pair of radial electromagnets and obtaining a value obtained by multiplying the obtained first difference by a coefficient as a bearing load in the radial direction, and for obtaining second difference between values of the exciting currents supplied to the pair of axial electromagnets and obtaining a value obtained by multiplying the obtained second difference by a coefficient as a bearing load in the axial direction.

2. The magnetic bearing device according to claim 1, wherein
   the calculator includes differential amplifying circuits provided for the pair of radial electromagnets and the pair of axial electromagnets, respectively, and
   the exciting currents supplied to the pair of radial electromagnets or the pair of axial electromagnets corresponding thereto are input to an inverted input terminal and a non-inverted input terminal of the differential amplifying circuit.

3. A magnetic bearing spindle device comprising a main shaft as a rotor shaft in which a tool or a work is mounted, the main shaft being supported by the magnetic bearing device according to claim 1 in a non-contact manner.

* * * * *